Oct. 28, 1969  B. VOCK ET AL  3,475,581
WELDER WITH THERMAL INSULATION STRIPPER
Filed Dec. 12, 1966

INVENTORS
BERNHARD VOCK &
LeROY J. TORREY

BY Hurwitz, Rose & Green
ATTORNEYS

United States Patent Office 3,475,581
Patented Oct. 28, 1969

3,475,581
WELDER WITH THERMAL INSULATION STRIPPER
Bernhard Vock and LeRoy J. Torrey, Eau Gallie, Fla., assignors to Radiation Incorporated, Melbourne, Fla., a corporation of Florida
Filed Dec. 12, 1966, Ser. No. 600,921
Int. Cl. B23k *11/30*
U.S. Cl. 219—86                8 Claims

ABSTRACT OF THE DISCLOSURE

A conventional resistance welding head is provided with a heater assembly including a high temperature electrode maintained in contact with a usual welding electrode of the weld head, and with a circuit for supplying power to the heater assembly to heat the high temperature electrode and the contacting electrode so as to melt the insulation from an insulation-covered wire or other conductor constituting one of the items to be welded, immediately preceding the welding cycle.

BACKGROUND OF THE INVENTION

The present invention relates generally to welding machines, and in particular to a welding machine combined with apparatus for thermally removing insulation from one or more of the items to be welded, as a part of or immediately preceding the welding cycle.

In the past, the typical procedure for welding items including one or more covered or partially covered with insulation, involved the preparatory step of removing the insulative covering by such means as abrading, stripping, or burning the insulation from the wire. These techniques are extremely time consuming and are usually performed well in advance of the welding operation, thus adding several steps to assembly line fabrication.

It has also been proposed to provide welders with the capability of welding through insulated wire up to 0.010 inch in diameter by use of some form of insulation-stripping or -burning device as an adjunct to the welding machine, but insofar as we are aware, such arrangements have either been unsuccessful or have resulted in substantial complexity of the original welding head.

SUMMARY OF THE INVENTION

Briefly, according to the present invention there is provided in a welding machine of the resistance welding type, a thermal insulation stripper including a heater assembly, a heater electrode retained by the heater assembly and maintained in contact, under substantially uniform pressure, with one welded electrode of the weld head, and circuit means for triggering the heating of or energizing the heater assembly and heater electrode in response to actuation of movement of the welder electrodes, so as to apply heat to the welder electrode with which the heater electrode is in contact, and thereby melt the insulation on the conductor constituting one of the items to be welded.

Accordingly, it is a principal object of the present invention to provide improvements in welding machines by incorporating in the circuit and structure of the welding machine a thermal insulation stripper, actuated immediately prior to the actual welding cycle for a predetermined time interval.

BRIEF DESCRIPTION OF THE DRAWING

The above and still further objects, features and attendant advantages of the present invention will become apparent from a consideration of the following detailed description of a preferred embodiment thereof, especially when taken in conjunction with the accompanying drawings, in which.

DESCRIPTION OF THE PREFERRED EMBODIMENT

Figure 1:
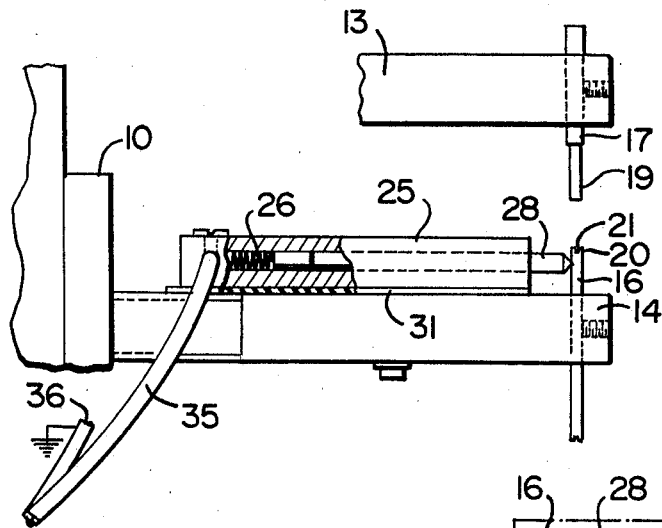
FIGURE 1 is a fragmentary side view of a weld head, with electrode horns and electrodes, showing the placement of the heating assembly and heater electrode of the present invention.

Referring now to the drawings, and more particularly to FIGURE 1 thereof, a standard resistance welding head 10 accommodates a pair of electrode horns 13, 14 which for the sake of convenience and example will be referred to as top electrode horn and bottom electrode horn, respectively. It will be understood, of course, that such terminology places no limitations on the relative locations of the two horns or of the electrodes retained thereby. Electrodes 17, 16, which may be composed of tungsten, are fastened in the top and bottom horns, respectively, in any convenient and conventional manner, the faces 19, 20 of the electrode tips being aligned in confronting relationship so that the items to be welded may be disposed therebetween and clamped when the two electrodes are brought together. One or both of the electrode faces may be provided with a groove, such as 21 in tip 20.

In a known manner, a weld is accomplished using a typical resistance welder by discharging a power supply through the welding head for a set or controllable time interval. Current flows through the electrodes, provided a conductive path exists therebetween, and the work pieces are welded together as a result of the heat generated at the high resistance point or points of contact therebetween. The present invention modifies the standard weld head to permit welds to be made where one of the items to be welded is insulated, such as insulation covered stranded or solid wire, without the usual preceding step of scraping, cutting or abrading the insulation from the wire. To this end, the welding head is provided with a heater assembly 25, preferably composed of conventional resistance heater material such as graphite, and retaining a spring-loaded carbon-copper plated electrode 28 maintained in contact with lower tungsten electrode 16. Heater assembly 25 may conveniently be mounted on lower electrode horn 14, with a layer 31 of thermal insulation material such as asbestos, interposed therebetween to prevent heating of the electrode horn by conduction.

Heating of the heater assembly 25, and thence of the heater electrode 28 by conduction and resistance heating, is accomplished in rapid fashion, less than ¼ of a second, by selective application of substantial electrical power from a transformer to heavy copper leads 35 and 36, the former fastened to the heater assembly 25 and the latter to a convenient point of ground or reference potential.

Figure 2:
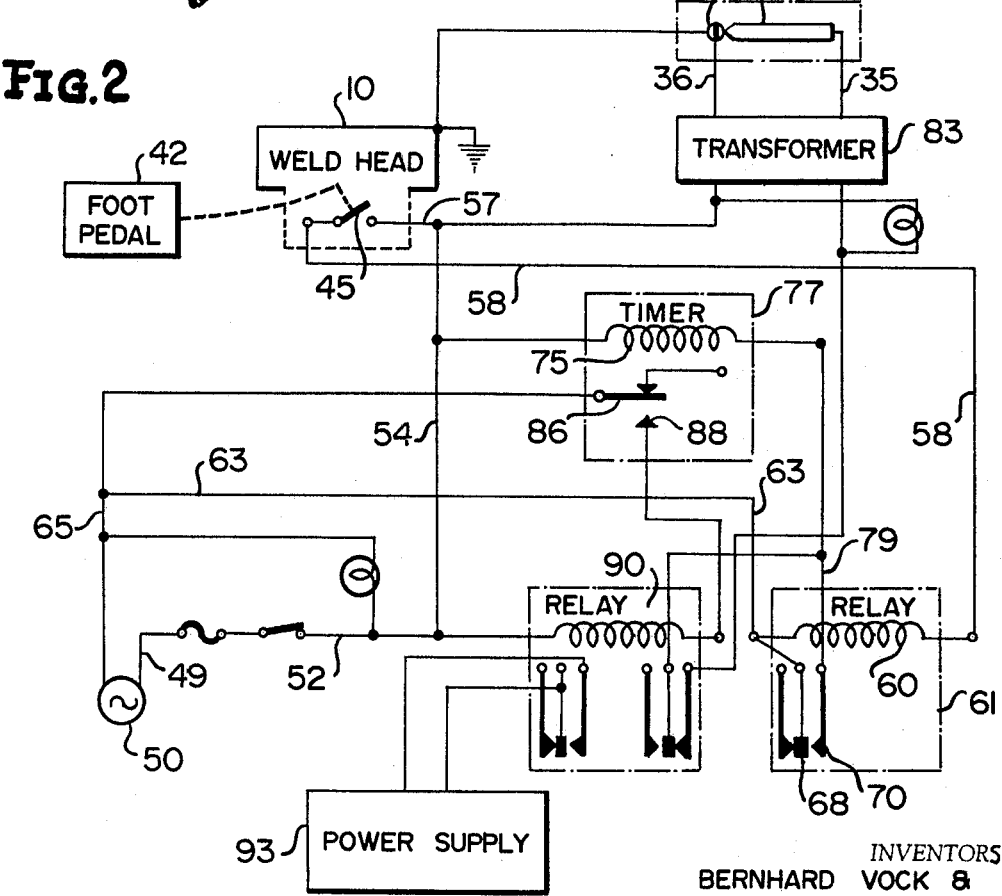
FIGURE 2 is a circuit diagram of an embodiment of heater energizing circuit of the present invention.

The heating and welding cycles may be accomplished with the exemplary circuit embodiment shown in FIGURE 2. Initially, the insulation-covered or -coated conductor (not shown) is placed in groove 21 of bottom or lower electrode 16 and the item to which it is to be welded is positioned between the conductor and top or upper electrode 17. For example, it may be desired to weld the conductive wire to a metal pin or other terminal (not shown). In any event, the foot pedal 42, associated with the welding head 10, is depressed to bring the movable electrode horn, usually the upper one, toward the other and thus force the confronting electrodes 16, 17 together with the items to be welded now clamped therebetween. As the foot pedal is depressed and the desired (predetermined) pressure is obtained between top and bottom electrode, a switch 45, such as a conventional microswitch in the weld head, is actuated. This completes a circuit from the positive (or "high") terminal 49 of an A-C power source 50, such as the typical standard 115 volt, 60 cycle commercial power supply, along paths 52, 54, 57, 58 through coil 60 of relay 61, and along paths 63 and 65 back to the "low" side (reference terminal) of power supply 50.

Relay 61, which is shown with its contacts in the normal (i.e., non-energized) state, is energized and armature 68 therefore moves into electrical contact with fixed contact 70. Accordingly, a closed circuit exists through the coil 75 of timer 77 for energization from power source 50, via paths 52, 54, 79, 63 and 65, to start the timer. It will also be observed that closing of switch 45 in weld head 10 results in application of power from source 50 to heavy duty transformer 83 and thence via leads 35 and 36 to the heater assembly 25 and heater electrode 28. Tungsten electrode 16 is therefore subjected to substantial heating at its contact point with heater electrode 28, sufficient to melt the insulation of the wire.

Following completion of the heating cycle, as determined by timer 77, armature 86 thereof moves against fixed contact 88, thus completing a circuit for energization of relay 90 to discharge power supply 93 through the weld head and the welder electrode (via a conventional path, not shown). The weld is thereby completed and the overall unit is now ready for the next item to be welded.

In a practical embodiment of the unit built in accordance with the principles of the invention, satisfactory operation was manifested using a weld head (10) model VTA-39 and power supply (93) model VTW-30B, both marketed by Hughes Aircraft, a 500 watt transformer (83) model 105–B2 and carbon-copper plated electrode (28) 10524, both marketed by WASSCO. Electrode 28 was sharpened at the end to be maintained in contact with electrode 16, with a flat on the point of approximately .040 diameter. The spring 26 in heater assembly 25 is preferably sufficient to maintain substantially constant pressure between the heater electrode and electrode 16, and the carbon point of the heater electrode was placed approximately .06 inch below the face or flat 20 of electrode 16.

A tungsten electrode 16 with groove (21) size for accommodating each wire gauge to be welded is preferably provided to insure rapid melting of the insulation, viz., ¼ second or less. Successful operation has been obtained with such insulation materials as vinyl, formvar, and even Teflon.

We claim:

1. In combination with a resistance welding head having a pair of electrodes movable relative to one another to clamp conductive items to be welded between the tips of the welding electrodes, and control means for moving said electrodes relative to one another to produce said clamping, apparatus for thermally removing insulation from one or more of said conductive items prior to welding of said items, said apparatus comprising
a resistance heater including a heater electrode of high resistance urged against one of said welding electrodes under substantially constant pressure, and
means associated with said control means for selectively energizing said resistance heater upon application of predetermined clamping pressure between said welding electrodes, said energizing means including
a source of electrical power,
a timing circuit for restricting the heating cycle to a predetermined period, and
circuit means responsive to actuation of said predetermined clamping pressure between said welding electrodes for completing a closed circuit from said source of electrical power to said timing circuit, and a further closed circuit from said source of electrical power through said resistance heater and said one welding electrode to cause resistance heating of only said one welding electrode against which said heater electrode is urged to a temperature sufficient to thermally remove the insulation from said items in the region to be welded,
said timing circuit responsive to completion of said predetermined period to open said circuit from said source through said resistance heater and said one welding electrode, and to initiate the welding cycle.

2. The combination according to claim 1 wherein said one welding electrode against which said heater electrode is urged is immovable and the other welding electrode is movable during said clamping operation.

3. The combination according to claim 1 wherein said one welding electrode is directly connected to a point of ground potential.

4. The combination according to claim 1 wherein said resistance heater further includes an electrode holder, and spring means for urging said heater electrode outwardly from said holder against said one welding electrode; and wherein said resistance welding head further includes a pair of electrode horns to which said pair of welding electrodes respectively are attached, said electrode holder mounted on the horn for said one welding electrode.

5. The combination according to claim 1 wherein said circuit means includes a transformer for supplying energizing power from said source of electrical power to said resistance heater.

6. The combination according to claim 4 wherein said heater electrode is urged against a point on said one welding electrode immediately adjacent the tip of said one welding electrode to produce rapid heating of said one welding electrode at a region with which said insulation on one of said items to be welded is on contact.

7. The combination according to claim 6 wherein the tip of said one welding electrode is provided with a groove to accommodate the insulation covered item of the items to be welded.

8. The combination according to claim 7 wherein said heater electrode is composed of copper plated carbon, said heater electrode holder is composed of graphite, and said welding electrodes are composed of tungsten.

References Cited
UNITED STATES PATENTS

| | | | |
|---|---|---|---|
| 3,418,444 | 12/1968 | Ruehlman | 219—113 |
| 1,613,957 | 1/1927 | Madden | 219—86 |
| 3,155,809 | 11/1964 | Griswold | 219—86 |
| 3,272,960 | 9/1966 | Smith | 219—91 |

JOSEPH V. TRUHE, Primary Examiner

B. A. STEIN, Assistant Examiner

U.S. Cl. X.R.

219—91